United States Patent [19]

Tada et al.

[11] Patent Number: 5,033,691
[45] Date of Patent: Jul. 23, 1991

[54] WEBBING RETRACTOR

[75] Inventors: Tatsuo Tada, Kamakura; Eiji Konno, Machida, both of Japan

[73] Assignee: Nippon Seiko Kabushiki Kaisha, Tokyo, Japan

[21] Appl. No.: 9,487

[22] Filed: Feb. 2, 1987

[30] Foreign Application Priority Data

Feb. 3, 1986 [JP] Japan .............................. 61-13167[U]

[51] Int. Cl.$^5$ ...................... B65H 75/48; A62B 35/02
[52] U.S. Cl. ............................................ 242/107.4 R
[58] Field of Search ................ 242/107.4 R, 107.4 A, 242/107.4 D, 107.4 C, 107.4 E; 74/575, 576, 577, 577 M; 254/DIG. 12; 411/399

[56] References Cited

U.S. PATENT DOCUMENTS

| 789,107 | 5/1905 | Steele | 411/399 X |
|---|---|---|---|
| 3,021,091 | 2/1962 | Swanson | 242/107.4 R X |
| 3,754,722 | 8/1973 | Nohren | 242/107.4 A |
| 3,858,824 | 1/1975 | Stephenson | 242/107.4 A |
| 3,952,966 | 4/1976 | Burleigh | 242/107.4 R |
| 3,958,773 | 5/1976 | Sugar | 242/107.4 R |
| 4,195,795 | 4/1980 | Ardizio | 242/107.4 A |
| 4,555,074 | 11/1985 | Kawai et al. | 242/107.4 A |
| 4,564,154 | 1/1986 | Takada | 242/107.4 A |

*Primary Examiner*—Katherine Matecki
*Attorney, Agent, or Firm*—Wegner, Cantor, Mueller & Player

[57] ABSTRACT

A webbing retractor includes a base, a take-up spindle supported rotatably on the base, a ratchet wheel mounted on the take-up spindle, a pawl engageable with the ratchet wheel, and a means supporting the pawl on the base. The supporting means includes a pawl pin having a large-diameter portion and small-diameter portion, a hole receiving the small-diameter portion of the pawl pin, a means for preventing the pawl pin from slipping off from the hole, and a bulged part pressed out in the direction of the thickness of the base. The bulged part has outer wall defining the hole and extending substantially in parallel to the base and a shoulder portion extending between the base and outer wall. The large-diameter portion of the pawl pin is arranged within the bulged part.

5 Claims, 2 Drawing Sheets

WEBBING RETRACTOR

BACKGROUND OF THE INVENTION

1) Field of the Invention

This invention relates to a webbing retractor suitable for use in a vehicle seat belt system, especially to a webbing retractor in which a pawl pin supporting portion of a side wall of the retractor base is prevented from being deformed by loads applied to a pawl pin.

2) Description of the Prior Art

FIG. 1 shows the structure of a typical webbing retractor in order to facilitate the understanding of the present invention. There are shown a base 1 of the webbing retractor, side walls 2,3 of the base 1, a spool 4 with a webbing wound thereon, a released portion 4' of the webbing, a take-up spindle 6 supported rotatably on the base 1 and holding the webbing at the inner end thereof, a ratchet wheel 5 mounted on the take-up spindle 6 so as to allow the ratchet wheel 5 to rotate together with the take-up spindle 6, a pawl 7, a pawl pin 8, a pendulum-like control member 9, and a cover 10 enclosing a take-up spring (not shown) for the webbing.

FIG. 2 illustrates the operation of the pawl 7. The pawl 7 is in engagement with the ratchet wheel provided on the base 1. The pawl 7 is attached on the side wall 2 by way of the pawl pin 8.

FIG. 3 shows the manner of attachment of the pawl pin 8. The pawl pin 8 is force-fit at a small-diameter portion 81 in the side wall 2, so that the pawl pin 8 is supported in a cantilevered state. When the pendulum-like control member 9 is swung in the event of an emergency of the vehicle, the pawl 7 is upwardly brought into engagement with the ratchet wheel and a force is hence applied to the pawl 7 as depicted in FIG. 4, and as a result, a load is exerted on the pin 8 as indicated by P in FIG. 3. As shown in FIG. 5, the pin supporting portion of the side wall 2 is thus deformed as indicated by numeral 21. In FIG. 4, R indicates the direction of rotation of the ratchet wheel 5. When a load is applied to the pin 8 and the side wall 2 is deformed as a result, the center of the pin 8 is shifted in the direction indicated by the arrow D so that the distance between the center of the take-up spindle 6 and that of the pin increases. As a result, the pawl 7 is caused to turn as indicated by the arrow a. The retractor is therefore unstable and is susceptible to damages even by small loads. The pin 8 is easily slipped off when the pin 8 is supported in a cantilevered state as shown in FIG. 3. It may be therefore be contemplated to provide a large-diameter portion 82 with the pin 8 inside the side wall 2 as depicted in FIG. 6. However, the pin supporting portion of the side wall 2 is still prone to deformation as indicated by numeral 21 by the load P applied to the pin 8 as illustrated in FIG. 7.

In order to prevent the pawl pin 8 from being easily slipped off by bending moments, it has also been proposed to support the pin 8 between the side walls 2 and 3 as shown in FIG. 8 or to provide a reinforcement plate 11 between the take-up spindle 6 and pawl pin 8 as depicted in FIG. 9. Although the pawl pin 8 is not supported in a cantilevered state but is supported at both ends thereof, it is still impossible to avoid the deformation of the side walls or reinforcement plate when loads are applied to the pawl pin 8.

It may be contemplated to increase the wall thickness of the base at the pin supporting portion or portions only. This approach however results in cumbersome fabrication, leading to an inevitable increase to the manufacturing cost.

SUMMARY OF THE INVENTION

With the foregoing in view, the present invention has as its principal object the provision of a webbing retractor free of the above-described drawbacks of the conventional webbing retractors.

It has now been found that the deformation of the wall around the pin hole can be avoided by lowering the pressure per unit area which is to be developed between the force-fit portion of the pawl pin and the side wall upon application of a load on the pawl pin, specifically, by forming a stepped part at the pin supporting part of the side wall and maintaining the stepped part in engagement with a stepped pawl pin so as to distribute loads.

In one aspect of this invention, there is thus provided a webbing retractor which comprises:

a base;

a take-up spindle supported rotatably on the base;

a ratchet wheel mounted on the take-up spindle;

a pawl engageable with the ratchet wheel; and a means supporting the pawl on the base, said supporting means having a pawl pin supporting the pawl rotatably thereon and defining a large-diameter portion and small-diameter portion, a hole formed through the base and receiving therein the small-diameter portion of the pawl pin, a means for preventing the pawl pin from slipping off from the hole, and a bulged part pressed out in the direction of the thickness of the base, said bulged part having an outer wall defining the hole and extending substantially in parallel to the base and a shoulder portion extending between the base and outer wall, said large-diameter portion of the pawl pin being arranged within the bulged part.

When a load is exerted on the pawl pin, the resulting force is distributed and the pressure per unit area developed between the pawl pin and the bulged part is hence reduced owing to the combined provision of the large and small-diameter portions and the bulged part. It is thus feasible to avoid the deformation of the side wall.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE PREFERRED EMBODIMENTS

Figure 10:
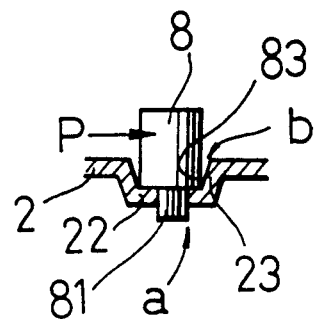
FIG. 10 shows a pawl pin attached in accordance with the present invention.

FIG. 10 shows the first embodiment of this invention. A supporting portion of the side wall 2, where the pawl pin 8 is attached on the side wall 2, is formed at a bulged part 22. The pin 8 is force-fit at the small-diameter portion 81 in the hole formed through the outer wall of the bulged part 22 of the side wall 2. Even when a load is applied in the direction indicated by the arrow P, the load is distributed to the area a of engagement between the side wall 2 and the small-diameter portion 81 of the pin 8 and to the area b of contact between a shoulder portion 23 of the bulged part 22 and a shoulder portion 83 of the pin 8, whereby the pressure per unit area is reduced and the deformation of the side wall is prevented accordingly.

Figure 1:
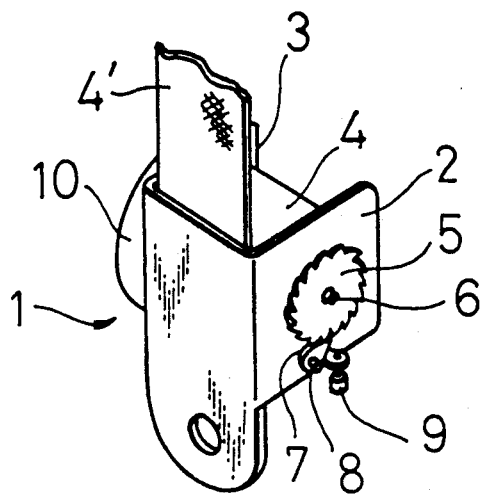
FIG. 1 shows the outline structure of a webbing retractor.
Figure 2:
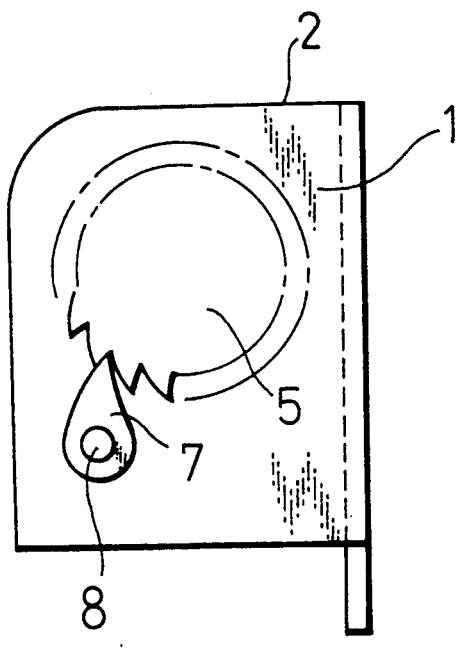
FIG. 2 depicts the relation between a ratchet wheel and a pawl.
Figure 3:
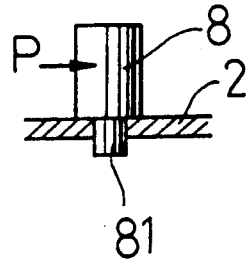
FIG. 3 illustrates a conventional manner of attachment of a pawl pin.
Figure 4:
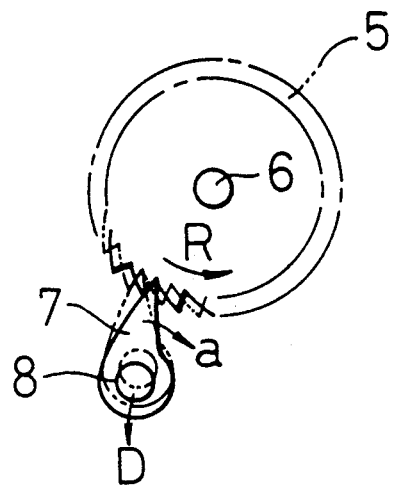
FIG. 4 is an illustration of the relation between a take-up spindle and a pawl pin.
Figure 5:
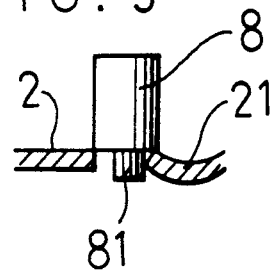
FIG. 5 shows a deformed side wall.
Figure 6:
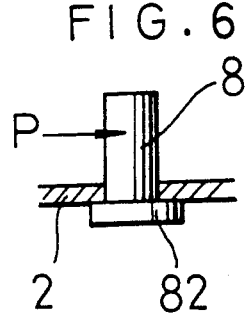
FIG. 6 shows another manner of attachment of the pawl pin.
Figure 7:
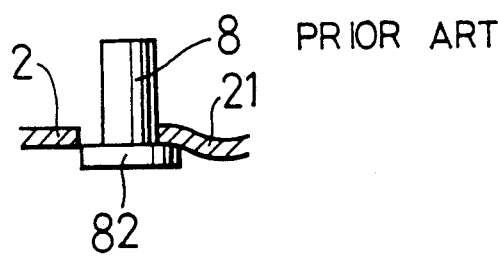
FIG. 7 illustrates a deformation of the side wall with a pawl pin secured thereon in the manner depicted in FIG. 6.
Figure 8:
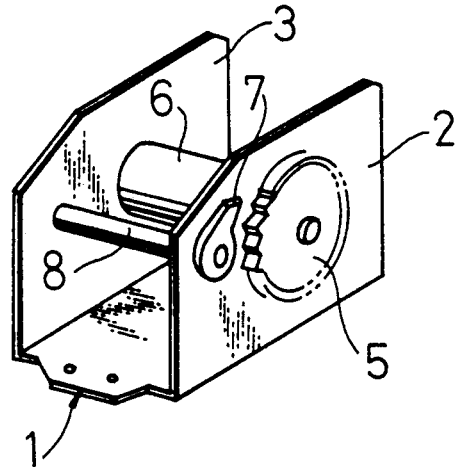
FIGS. 8 and 9 show other webbing retractors by way of example.
Figure 9:
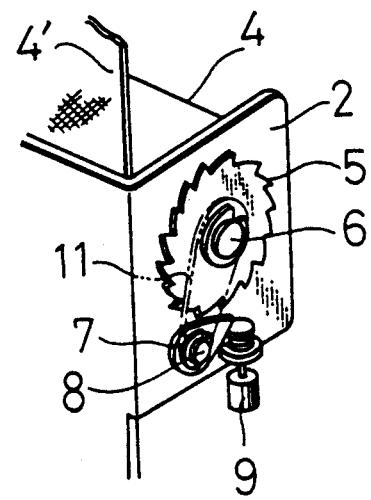
Figure 11:
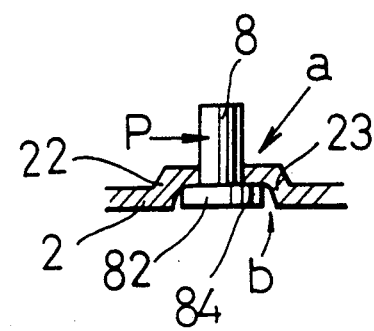
FIG. 11 illustrates another embodiment of this invention.

FIG. 11 illustrates another embodiment, in which the pin 8 is force-fit in the side wall 2 but the pin 8 has a large-diameter portion 82 inside the side wall 2. In addition, the bulged part 22 is formed at the pin supporting portion. Accordingly, the load P is distributed to the force-fit portion a of the pin 8 in the side wall 2 and the area b of contact between a shoulder portion 23 of the bulged part 22 and the peripheral surface 84 of the large-diameter portion of the pin 8, whereby the pressure per unit area is reduced and the deformation of the side wall is prevented as a consequence.

The bulged part may be formed in two stages (correspondingly, the diameter of the pin changes in two stages) instead of the single stage used in the illustrated embodiments. Needless to say, this modified structure may be used in combination with a reinforcement plate. In this case, the reinforcement plate and the pawl pin may be stepped at portions where they are connected to each other, thereby distributing loads.

Having now fully described the invention, it will be apparent to one of ordinary skill in the art that many changes and modifications can be made thereto without departing from the spirit or scope of the invention as set forth herein.

We claim:

1. A webbing retractor comprising:
   a base;
   a take-up spindle supported rotatably on the base;
   a ratchet wheel mounted on the take-up spindle;
   a pawl engageable with the ratchet wheel; and
   means for supporting the pawl on the base, said supporting means comprising a pawl pin supporting the pawl rotatably thereon and defining a large-diameter portion and small-diameter portion, a hole formed through the base which receives therein the small-diameter portion of the pawl pin, a means for preventing the pawl pin from slipping off from the hole, and a bulged part pressed out of the base, said bulged part having an outer wall extending substantially in parallel to the base and spaced transversely therefrom, and a shoulder portion which extends between the base and outer wall, said hole being formed in the outer wall, and said large-diameter portion of the pawl pin being arranged within the bulged part.

2. The webbing retractor as claimed in claim 1, wherein the pawl pin is supported in a cantilevered state on the base.

3. The webbing retractor as claimed in claim 1, wherein the pawl is supported on the large-diameter portion of the pawl pin.

4. The webbing retractor as claimed in claim 1, wherein the pawl is supported on the small-diameter portion of the pawl pin.

5. The webbing retractor as claimed in claim 1, wherein a peripheral surface of the large-diameter portion of the pawl pin is in contact with the shoulder portion of the bulged part.

* * * * *